June 19, 1951     I. A. SCHIPPER     2,557,516
FISH DECOY
Filed Aug. 8, 1946
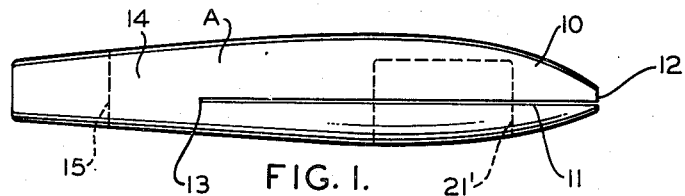
FIG. 1.
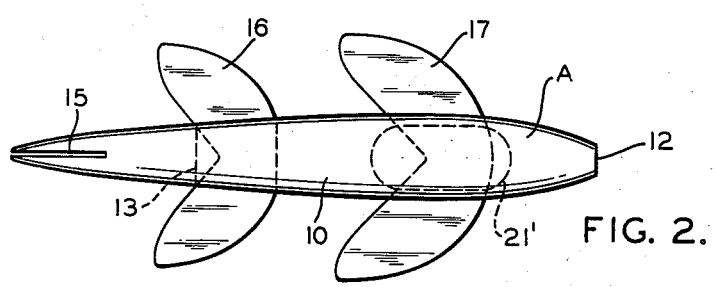
FIG. 2.
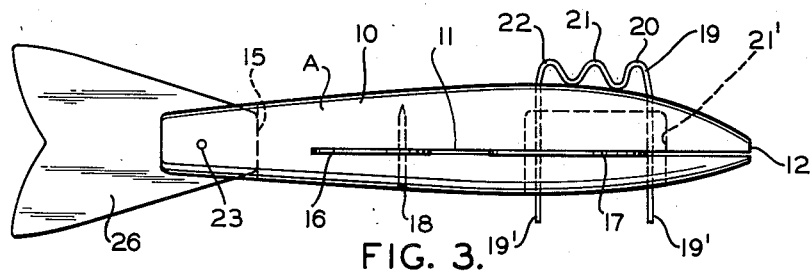
FIG. 3.
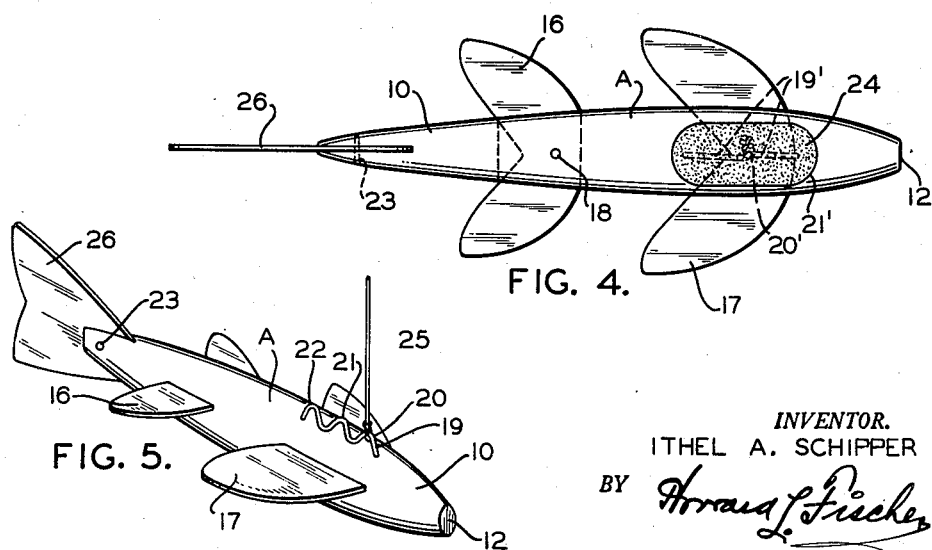
FIG. 4.
FIG. 5.
INVENTOR.
ITHEL A. SCHIPPER
BY
*Attorney*

Patented June 19, 1951

2,557,516

UNITED STATES PATENT OFFICE 2,557,516

FISH DECOY

Ithel A. Schipper, Wayzata, Minn.

Application August 8, 1946, Serial No. 689,124

2 Claims. (Cl. 43—42.39)

This invention relates to a fish decoy and the method of making the same, which decoy is for the purpose of attracting fish so that they may be speared when fishing in dark houses on the lake in the winter, which houses are put on the ice over a fish hole. The decoy is not equipped with fish hooks but is formed to provide a fish decoy which will attract the fish close enough to the surface of the water in the fish hole in the ice so the fish may be speared.

The method of making my decoy resides in forming the decoy with a body portion similar to a small fish. This body portion is formed on its bottom surface near the forward end thereof with a recess which is adapted to be filled with lead so that it will submerge the decoy beneath the water surface. The lead filler being for the purpose of balancing the decoy in the water and causing the decoy to move freely in the water when pulled moderately hard by the fisherman.

The method further includes the forming of a slot in the tail of the body and inserting a metal tail fin therein. Further the method includes the forming of a longitudinal slot extending from the front end of the body and carrying back to a point adjacent the forward end of the slot for the tail fin. Then the decoy is completed by inserting a pair of transverse fins which are spaced apart to provide one fin near the front end of the decoy and one fin near the rear or tail end of the decoy. Each of these horizontal fins extend horizontally from each side of the body of the decoy. The method is completed by inserting a wire down through the top of the body with the free ends of the wire engaging and twisted around the forward horizontal fin in the recess, which receives a lead weight. This wire member is formed with a series of notches which form different points of attachment for the line which supports the decoy. The final operation in the method resides in pouring molten lead into the recess which provides a weight on the bottom or belly of the decoy and which also acts to anchor the wire of the forward horizontal fin. The decoy may be painted any color to make it more attractive.

The wire member is bent to form three attachments on the dorsal-thoracic region of the decoy. The foremost attachment is so placed that attachment of a line to it will place the decoy body at an approximate 45 degree angle, with the head pointing upward. The middle attachment will place the decoy at an approximate 22½ degree angle, head pointing upward. When attachment is made to the most posterior notch, the decoy will be at a horizontal position. The foremost attachment will give the decoy a more rapid-gliding movement when in operation. The posterior attachment will put the decoy in position to be jiggled slightly and is useful for attraction to the angling areas.

The body fins are so placed that they will keep the body from rolling to either side. If a rolling action is desired it may be obtained by slightly raising or lowering the terminal parts of both fore and posterior fins on the same side.

The tail fin is so placed that it will guide the decoy in any direction desired. By moving the tail fin to the left when viewing the decoy dorsally and from the posterior the decoy will move in a counter-clockwise direction in a circle whose diameter is determined by the degree the tail fin is placed to the left. By bending the tail to the opposite side (right) a clockwise circle may be obtained.

In the drawings forming part of the specification:

Figure 1 is a side elevation of the wooden body of the decoy showing the respective slots and the recess for the weight.

Figure 2 is a plan view looking down on the decoy body after the body fins have been inserted in the slot provided for the same and spaced apart as indicated.

Figure 3 is a side view of the decoy showing the tail fin held in the rear slot formed in the body and with the body fins in place and also showing the wire member with the three notches for the attachment of the fisherman's line, the free ends of the wire member projecting down from the bottom of the decoy and showing the position of the free ends before they have been twisted together to anchor the wire line attachment around the forward body fin.

Figures 4 is a bottom view of the decoy showing the recess or opening with the lead weight embedded therein which anchors the wire member and the forward body fin and provides the weight for the wooden body of the decoy which causes the decoy to become submerged beneath the water surface.

Figure 5 is a perspective view of the completed fish decoy as it would appear in use with the fisherman's line attached to the forward notch of the wire for connecting the fish line to the decoy.

My method consists in forming a wooden body 10 to simulate the body of a fish and cutting a horizontal longitudinal slot 11 to extend from the front 12 of the body to a point 13 adjacent to the tail portion 14 of the wooden body of the decoy.

A vertical slot 15 is formed in the tail 14 of the body of the decoy A. These are the first steps of making my decoy A.

The next step of completing my decoy resides in placing the body fins 16 and 17 in the slot 11 in such a manner that they will project from the sides of the body adjacent the tail and in the thoracic region, respectively. The body fin 16 forms the posterior body fin and is anchored in place by the nail 18 shown in Figure 3.

The next step of the process resides in placing the wire line attachment 19 with the notches 20, 21, and 22 positioned on the dorsal-thoracic region of the decoy as illustrated in Figure 3. In placing the wire member 19 in position in the body of the decoy A, the free ends 19' extend on either side of the foremost body fin and these free ends are brought together and twisted in a knot at 20' which wraps the free ends 19' around the center portion of the foremost body fin 17.

An elongated recess 21' is formed on the under side of the body of the decoy A at the forward end thereof as illustrated in Figures 1, 2, 3 and 4. This recess 21' is adapted to receive molten lead which is poured into the recess and thus is caused to flow around the central portion of the foremost body fin 17 and to conceal the knotted end 20' of the ends 19' of the wire attachment 19.

The tail fin 26 is inserted in the vertical slot 15 and by means of the rivet 23 is anchored in the tail of the body 10.

This completes the method of making my decoy A.

The lead weight portion 24 fills the opening 21' and is anchored around the center of the foremost body fin 17. This weight 24 acts to provide a means which causes the decoy to be submerged beneath the surface of the water. The wooden body 10 acts to cause the decoy A to float in the water, thus the weight 24 counteracts the floating properties of the decoy A and is positioned in the thoracic or forward region of the decoy in the bottom of the same. It is of primary importance that this weight be properly positioned at the right degree from the front of the decoy so that in operation the decoy may be used to attract fish close enough to the surface of the water so they may be speared. In fishing through the ice, the fisherman usually puts a house over the hole chopped in the ice and the house is dark so that the fisherman can operate the decoy A in a manner to attract the fish to the surface of the water where they are speared by the fisherman.

In operation the decoy may be caused to move in various directions primarily as follows:

By attaching a line 25 to the forward loop 20, the body of the decoy will be caused to assume a position of a 45 degree angle with the head pointing upward as illustrated in Figure 5. When it is desired to change the position of the decoy A in the water, the line may be attached to the loop 21 which will cause the decoy to assume an approximate 22½ degree angle with the head pointing upward. When it is desired to cause the decoy to assume an approximate horizontal position in the water, the line 25 is attached to the loop 22. I have worked out a balancing of the decoy A in a comparatively accurate manner so as to carry out these different positions of the decoy in the water. When the line 25 is attached in the posterior loop 22, the decoy is positioned to be jiggled slightly and is attracting to the angling areas.

The body fins are so placed so they will keep the body from rolling from side to side. If, however, a rolling motion is desired, it may be obtained by slightly raising or lowering the ends of both front and posterior fins 17 and 16 respectively on the same side of the decoy.

The tail fin 26 is so placed it will guide the decoy in any desired direction, and by bending the tail fin to the left when viewing the decoy dorsally and from the posterior position the decoy will move in a counter-clockwise direction in a circle which diameter is determined by the degree the tail fin is placed to the left. However, by placing the tail fin to the opposite side (right) a clockwise circle will be obtained in the movement of the decoy in the water.

I have provided a simple method of making my decoy, however, the various steps in carrying out the method are important and the position of each of the members which make up the decoy are extremely important to get the proper balance to the finished decoy. It is important that the weight 24 be in the proper position in the body. The position of the body fins 16 and 17 are also important and it will be apparent that the manner in which the respective fins are bent will be important in the movement and the direction of the operation of the decoy.

I claim:

1. A fish decoy comprising a wooden body, said body having a horizontally and longitudinally extending slot formed therein and a recess extending thereinto adjacent the head and open at the bottom of said body, and a vertical slot in the tail end thereof; a tail fin anchored in said slot in said tail end, a pair of body fins spaced apart and positioned in said longitudinal slot, a weight in said recess, and a wire having a forward loop, a middle loop, and a rear loop projecting from said body for attachment of a line and having free end portions extending into said body about the foremost of the spaced body fins, the free ends of said wire being imbedded in said weight.

2. A fish decoy having a body portion formed of wood, a pair of horizontally disposed fins mounted in said body and spaced apart in such a manner as to project from the sides of said body in the thoracic region and adjacent the tail region respectively, a tail fin anchored in the tail of said body, a line attaching wire having a series of loops positioned on the dorsal-thoracic region of the decoy, and having ends extending into a recess formed in the belly of the decoy, and weight means in said recess adapted to surround the central portion of the forward body fin and to conceal the ends of the line attaching wire.

ITHEL A. SCHIPPER.

REFERENCES CITED

The following references are of record in the file of this patent:

UNITED STATES PATENTS

| Number | Name | Date |
|---|---|---|
| 1,188,583 | Townsend | June 27, 1916 |
| 1,376,590 | Stolley | May 3, 1921 |
| 1,698,736 | Roberts | Jan. 15, 1929 |
| 1,744,366 | Davenport | Jan. 21, 1930 |
| 1,792,779 | Tarr | Feb. 17, 1931 |

FOREIGN PATENTS

| Number | Country | Date |
|---|---|---|
| 185,874 | Great Britain | Sept. 21, 1922 |